(12) United States Patent
Karpati et al.

(10) Patent No.: US 7,860,959 B1
(45) Date of Patent: Dec. 28, 2010

(54) CONFIGURATION OBJECTIFICATION AND VERSION CONTROL

(75) Inventors: Danny Karpati, Netanya (IL); Roni Luxenberg, Ra'anana (IL); Doron Oz, Even Yehuda (IL); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1078 days.

(21) Appl. No.: 10/793,195

(22) Filed: Mar. 4, 2004

(51) Int. Cl.
*G06F 15/173* (2006.01)

(52) U.S. Cl. .................................................. 709/223

(58) Field of Classification Search ................. None
See application file for complete search history.

(56) References Cited

U.S. PATENT DOCUMENTS

| | | | |
|---|---|---|---|
| 5,897,636 A * | 4/1999 | Kaeser | 707/100 |
| 6,345,294 B1 | 2/2002 | O'Toole et al. | |
| 6,349,306 B1 * | 2/2002 | Malik et al. | 707/103 R |
| 6,370,141 B1 | 4/2002 | Giordano, III et al. | |
| 6,463,470 B1 | 10/2002 | Mohaban | |
| 6,467,049 B1 | 10/2002 | Robins et al. | |
| 6,549,943 B1 * | 4/2003 | Spring | 709/223 |
| 6,560,699 B1 * | 5/2003 | Konkle | 713/1 |
| 6,567,380 B1 | 5/2003 | Chen | |
| 6,651,096 B1 | 11/2003 | Gai et al. | |
| 6,681,382 B1 | 1/2004 | Kakumani et al. | |
| 2003/0041139 A1 * | 2/2003 | Beadles et al. | 709/223 |
| 2003/0105761 A1 * | 6/2003 | Lagerman | 707/10 |
| 2003/0126195 A1 * | 7/2003 | Reynolds et al. | 709/203 |
| 2004/0260706 A1 * | 12/2004 | Anonsen et al. | 707/100 |

OTHER PUBLICATIONS

IBM Rational ClearCase Change Management Products, IBM Corporation, (c) 2003. pp. 1-14.

* cited by examiner

*Primary Examiner*—Ario Etienne
*Assistant Examiner*—Clayton R Williams
(74) *Attorney, Agent, or Firm*—Cesari and McKenna, LLP (57) ABSTRACT

A technique maintains configurations of an intermediate node in a version control system. Entities within the intermediate node are represented by objects. Each object is associated with a state. Each object is distinct from other objects in the intermediate node, thus enabling the state of an object to be changed, without affecting other objects. Versions of the objects' states are maintained in the version control system. The version control system is configured to maintain one or more versions of state associated with the objects. A configuration of the intermediate node is defined by labeling a version of objects saved in the version control system. A configuration is applied to the intermediate node by acquiring the states of objects associated with the configuration from the version control system and configuring the intermediate node's entities represented by the objects in accordance with the acquired states.

27 Claims, 10 Drawing Sheets

CONFIGURATION OBJECTIFICATION AND VERSION CONTROL

BACKGROUND OF THE INVENTION

1. Field of the Invention

The present invention generally relates to data networking and specifically to maintaining configuration information for intermediate nodes in a data network.

2. Background Information

A data network is a geographically distributed collection of interconnected communication links and segments for transporting data between nodes, such as computer systems. Many types of network segments are available, with the types ranging from local area networks (LANs) to wide area networks (WANs). LANs typically connect personal computers and workstations over dedicated, private communications links located in the same general physical location, such as a building or a campus. WANs, on the other hand, typically connect large numbers of geographically dispersed nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Certain intermediate nodes in a data network, such as routers, are often configured to "route" data packets, between various nodes in the network. Routing is typically performed at the network layer or layer-3 (L3) of the Open Systems Interconnect (OSI) Reference Model. Routers often maintain routing databases, which are typically configured to hold routing information including L3 addresses and interface information that the routers use to determine where packets are to be forwarded in order to reach their destination. For example, a router may have a routing database containing one or more entries. Each entry may contain a L3 destination address of a destination node and interface information of an interface on the router through which the destination node may be reached. A packet containing a destination address that matches a destination address of an entry in the routing table is forwarded by the router to the interface, specified in the entry, for transfer to the destination node.

Intermediate nodes often contain various entities that are configurable. For example, an intermediate node may contain a number of ports that have various configurable entities associated with them, such as an operating speed and a mode of operation. In a typical arrangement, a user specifies parameters that are used to configure the configurable entities and saves them in a configuration file. The parameters may be specified via a command-line interface that communicates directly with the intermediate node or, alternatively, via a network management system (NMS) that communicates with the intermediate node using a protocol, such as the Simple Network Management Protocol (SNMP).

The configuration file is typically configured to hold a single configuration of the intermediate node, that is, the file contains a single version of parameters that is used to configure the entities in the intermediate node. The entities in the intermediate node are typically configured by i) reading the parameter information from the configuration file for all of the entities represented therein and ii) configuring the entities in accordance with the parameter information.

One problem with the above-described arrangement is that it does not easily accommodate changing parameters for a single entity. For example, assume a user wants to undo a change to the state of a single entity by restoring the state of the entity to the state specified in the configuration file. In some intermediate nodes, this may involve erasing the current states of all entities represented in the configuration file then restoring the states for all the entities in accordance with information contained in the configuration file. Restoring the states of the entities may, however, cause unwanted network outages, as certain entities may become unavailable for handling data packets from a time the current state is erased to the time the state is restored from the configuration file.

Another problem with the above-described arrangement is that it is difficult to maintain many different configurations for an intermediate node. For example, if only one configuration can be maintained in a configuration file, in order to accommodate more than one configuration for an intermediate node, separate configuration files would to have to be maintained (i.e., one for each configuration). As the number of different configurations increases, the number of configuration files needed to support the different configurations increases. If the number of configuration files is significant, managing the different configuration files may become quite complex.

SUMMARY OF THE INVENTION

The present invention overcomes various short-comings associated with the prior art by incorporating a version control system that maintains versions of states associated with objects that represent entities contained in an intermediate node. According to the inventive technique, "objectifying" entities denotes the use of objects to represent entities contained in an intermediate node. Each object is distinct from other objects in that an object may be manipulated, e.g., state associated with the object may be changed, without affecting other objects. The object states may be used to configure entities in the intermediate node. A configuration of the intermediate node is defined as a collection of object states. The inventive technique incorporates a version control system that is used to maintain versions of object states as well as configurations for the intermediate node.

Illustratively, objects are defined to represent entities contained in an intermediate node. Each object is associated with a state that may reflect one or more parameters associated with the object. A first configuration is generated for the intermediate node by i) establishing a first-state for objects in the intermediate node ii) saving the state in the version control system and iii) labeling the saved state with a label that identifies the first configuration. The first configuration is then applied to the intermediate node. A second (new) configuration is generated by i) changing the state of one or more objects, ii) saving the changed state in the version control system and iii) labeling the saved state with a label that identifies the second configuration. The new configuration is then applied to the intermediate node and a check is performed to determine if an error occurred. If so, the configuration of the intermediate node is "rolled back" to a prior configuration saved in the version control system.

By objectifying entities within an intermediate node and maintaining states for the various objects, the inventive technique allows entities to be restored individually without affecting other entities in the node. Advantageously, the inventive technique obviates network outages that may be caused by unnecessarily changing other entities in the intermediate node when an entity is restored. Moreover, by incorporating a version control system, the inventive technique enables many configurations of the intermediate node to be maintained in a single data file. The inventive technique obviates the complexity that may be involved if separate configuration files are maintained for separate configurations of the intermediate node.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
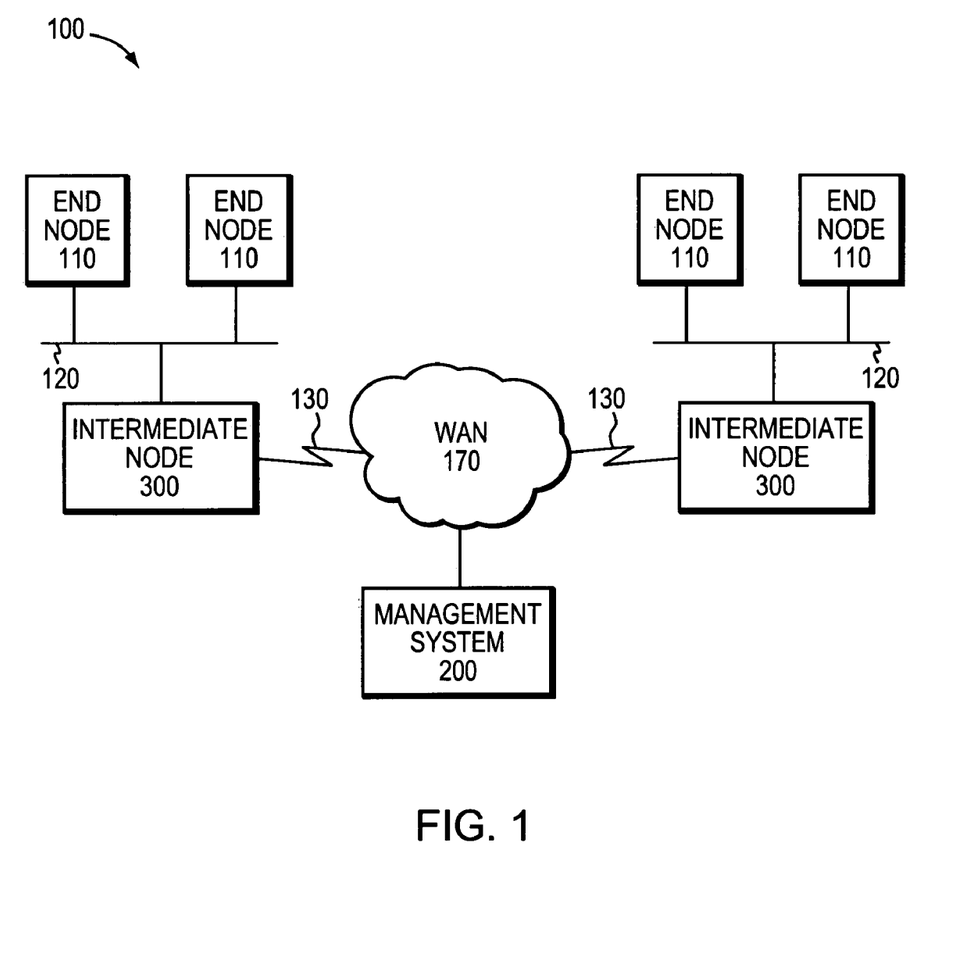
FIG. 1 is a schematic block diagram of an exemplary data network that may be advantageously used with the present invention.

FIG. 1 is a schematic block diagram of an exemplary data network 100 that may be advantageously used with the present invention. Data network 100 comprises a collection of communication links and segments connected to a plurality of nodes, such as end nodes 110 and intermediate nodes 300. The network links and segments may comprise local area networks (LANs) links 120 and wide-area network (WAN) links 130 interconnected by intermediate nodes 300 and WAN 170 to form an internetwork of nodes. These internetworked nodes communicate by exchanging data packets according to a predefined set of protocols, such as the Internet Protocol (IP). Network 100 further comprises a management system 200 that is configured to, inter alia, manage the intermediate nodes 300.

Figure 2:
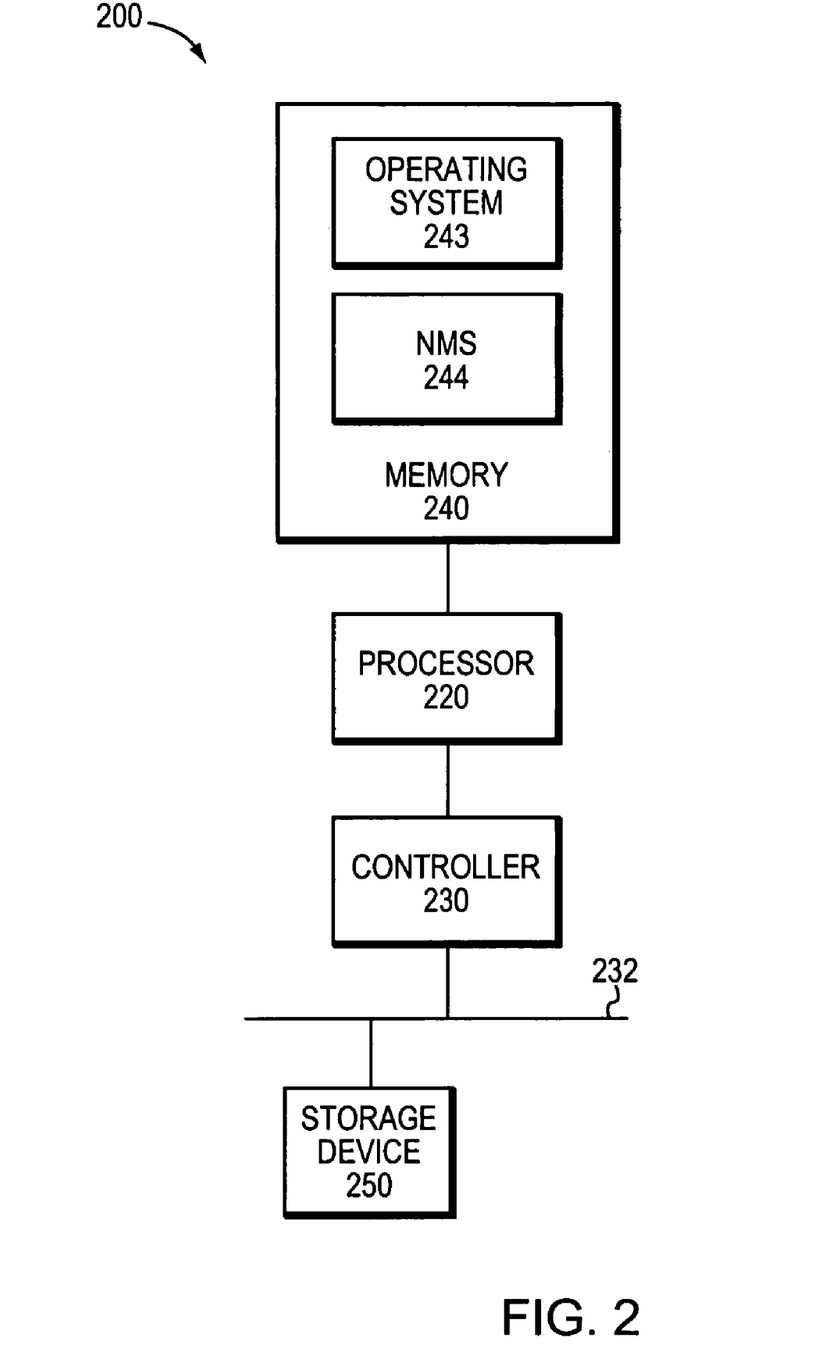
FIG. 2 is a high-level partial schematic block diagram of a management system that may be advantageously used with the present invention.

FIG. 2 is a partial schematic block diagram of a management system 200 that may be used with the present invention comprising a processor 220 coupled to a controller 230 and a memory 240, and a storage device 250 coupled to the controller 230 via an input/output (I/O) bus 232. Processor 220 is a conventional central processing unit (CPU) capable of executing computer instructions contained in e.g., memory 240. The controller 230 contains circuitry that enables processor 220 to communicate with various devices attached to the I/O bus 232 including storage device 250. Storage device 250 is a conventional data storage device, such as a disk unit, capable of storing data readable by processor 220. This data may include various data files, such as data files used to store information for a Network Management System (NMS) 244 contained in memory 240. Memory 240 is a random-access memory (RAM) implemented using, e.g., dynamic random access (DRAM) devices. Memory 240 contains an operating system 243 and NMS 244. The operating system 243 functionally organizes management system 200 and provides various functions in support of software processes executing on system 200 including NMS 244. NMS 244 is a conventional network management system that enables various functions performed by the intermediate nodes 300 to be managed by e.g., a user is logged into system 200. Suitable systems that may be used to implement management system 200 include an International Business Machines (IBM) personal computer (PC) available from IBM Corporation, Armonk, N.Y. and a Sun Workstation available from Sun Microsystems, Inc., Santa Clara, Calif.

Figure 3:
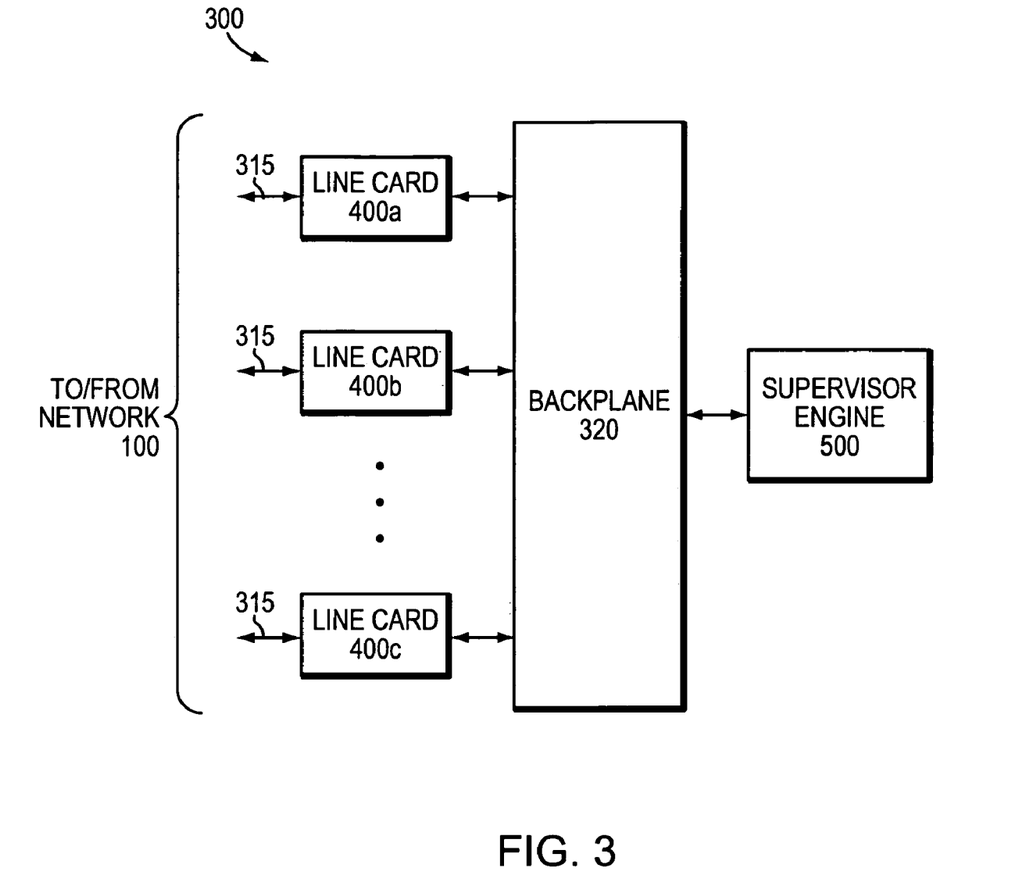
FIG. 3 is a high-level partial schematic block diagram of an intermediate node that may be advantageously used with the present invention.

FIG. 3 is a high-level partial schematic block diagram of an intermediate node 300, which is illustratively a router. It should be noted that other networking devices, such as a switch or a bridge, may take advantage of the present invention. Suitable intermediate nodes that may be used with the present invention include the Cisco 7200 and 7600 Series Routers available from Cisco Systems Incorporated, San Jose, Calif.

Intermediate node 300 comprises one or more line cards 400 and a supervisor engine card 500 interconnected by a backplane 320. Node 300 is configured to perform, inter alia, various conventional layer-2 (L2) and layer-3 (L3) switching and routing functions including executing routing protocols, such as the Open Shortest Path First (OSPF) protocol, the Intermediate-System-to-Intermediate-System (IS-IS) protocol and the Multiprotocol Label Switching (MPLS) protocol, as well as forwarding and processing data packets. As used herein, L2 and L3 refer to the data-link layer and network layer, respectively, of the Open Systems Interconnection (OSI) reference model. Node 300 is also configured to perform various functions related to managing configurations and versions of configurations associated with intermediate node 300 in accordance with the inventive technique.

The backplane 320 comprises a point-to-point interconnect fabric that interconnects the various cards and allows data and signals to be transferred from one card to another. The line cards 400 connect (interface) the intermediate node 300 with the network 100 and enable data packets to be transferred to and from the network via ports using various protocols such as, Asynchronous Transfer Mode (ATM), Ethernet, and T3. Functionally, the line cards 400 acquire data packets from the network 100 via the ports 315 and forward the data packets to the backplane 320, as well as transfer data packets acquired from the backplane 320 to the network 100 via the ports 315. The ports 315 may comprise, e.g., ATM, Ethernet, Fast Ethernet (FE), Gigabit Ethernet (GE), and frame relay (FR) ports.

Figure 4:
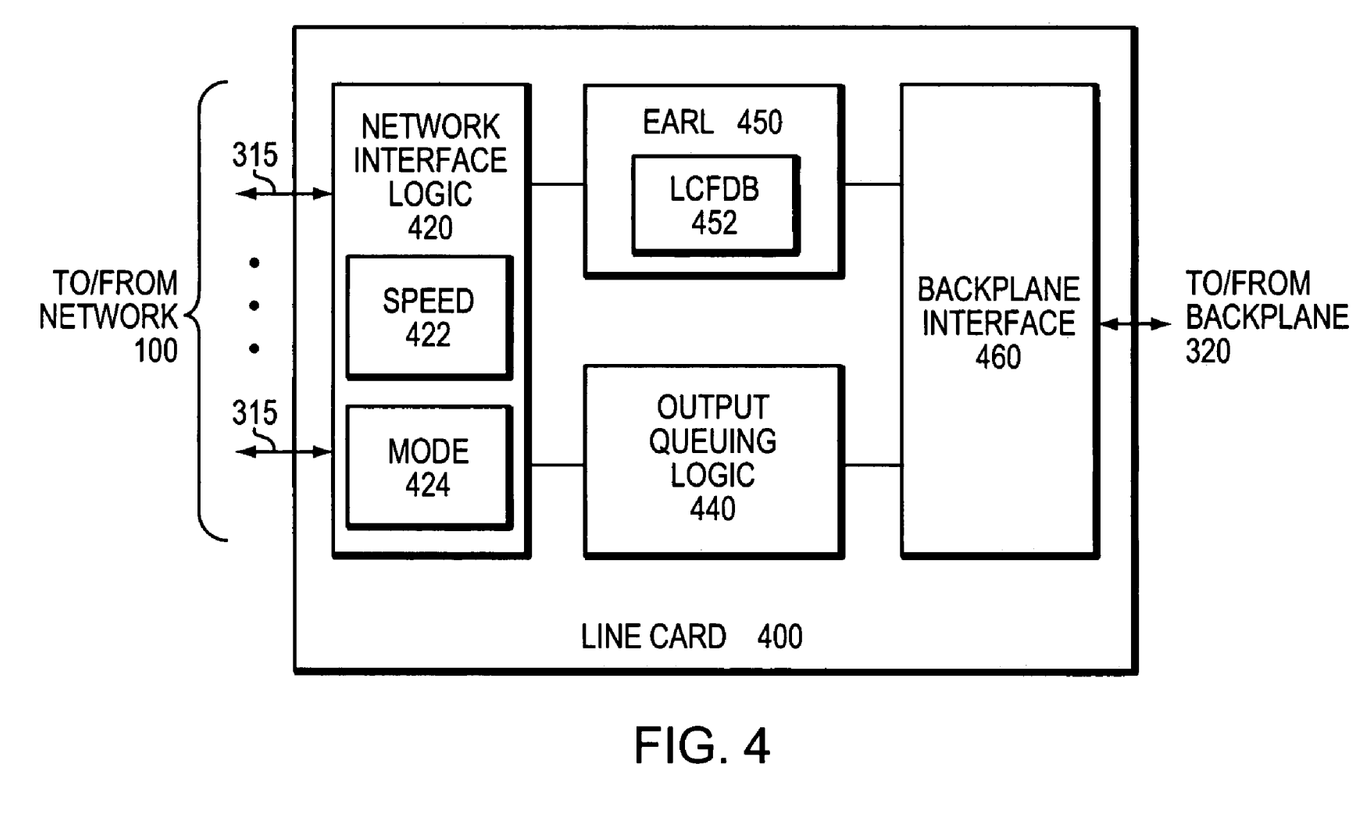
FIG. 4 is a high-level partial schematic block diagram of a line card that may be advantageously used with the present invention.

FIG. 4 is a high-level partial schematic block diagram of an exemplary line card 400 that may be advantageously used with the present invention. Line card 400 comprises network interface logic 420, encoded address recognition logic (EARL) 450, backplane interface logic 460, and output queuing logic 440. The line card 400 may contain a plurality of ports 315 coupled to the network 100.

The network interface logic 420 interfaces the line card 400 to the network 100 and enables the line card 400 to transfer data to and from the network 100 via the ports 315. To that end, logic 420 comprises conventional interface circuitry that may incorporate the signal, electrical and mechanical characteristics, and interchange circuits, needed to interface line card 400 with the network's physical media and protocols running over that media.

The network interface logic 420 further contains speed logic 422 configured to control the speed at which data is transferred to/from the network 100 via the ports 315 and mode logic 424 configured to control the mode (e.g., full-duplex, half-duplex) in which data is transferred to/from the network 100 also via the ports 315. Illustratively, line card 400 contains an instance of speed logic 422 and mode logic 424 for each port contained on the line card 400.

The backplane interface logic 460 contains circuitry that interfaces the line card to the backplane 320 and enables the line card 400 to transfer and acquire data to and from other cards coupled to the backplane 320. The output queuing logic 440 contains circuitry, such as output queues and scheduling control logic, configured to control the transfer of data packets onto the network 100 via the ports 315. The EARL 450 is illustratively embodied in an application-specific integrated circuit (ASIC) that comprises circuitry configured to, inter alia, acquire and process data packets including making forwarding decisions for the packets using e.g., a line-card forwarding database (LCFDB) 452 contained in the EARL 450. The LCFDB 452 contains information, such as destination addresses and associated destination ports, that enables the EARL 450 to determine destinations for packets processed by the EARL 450.

Figure 5:
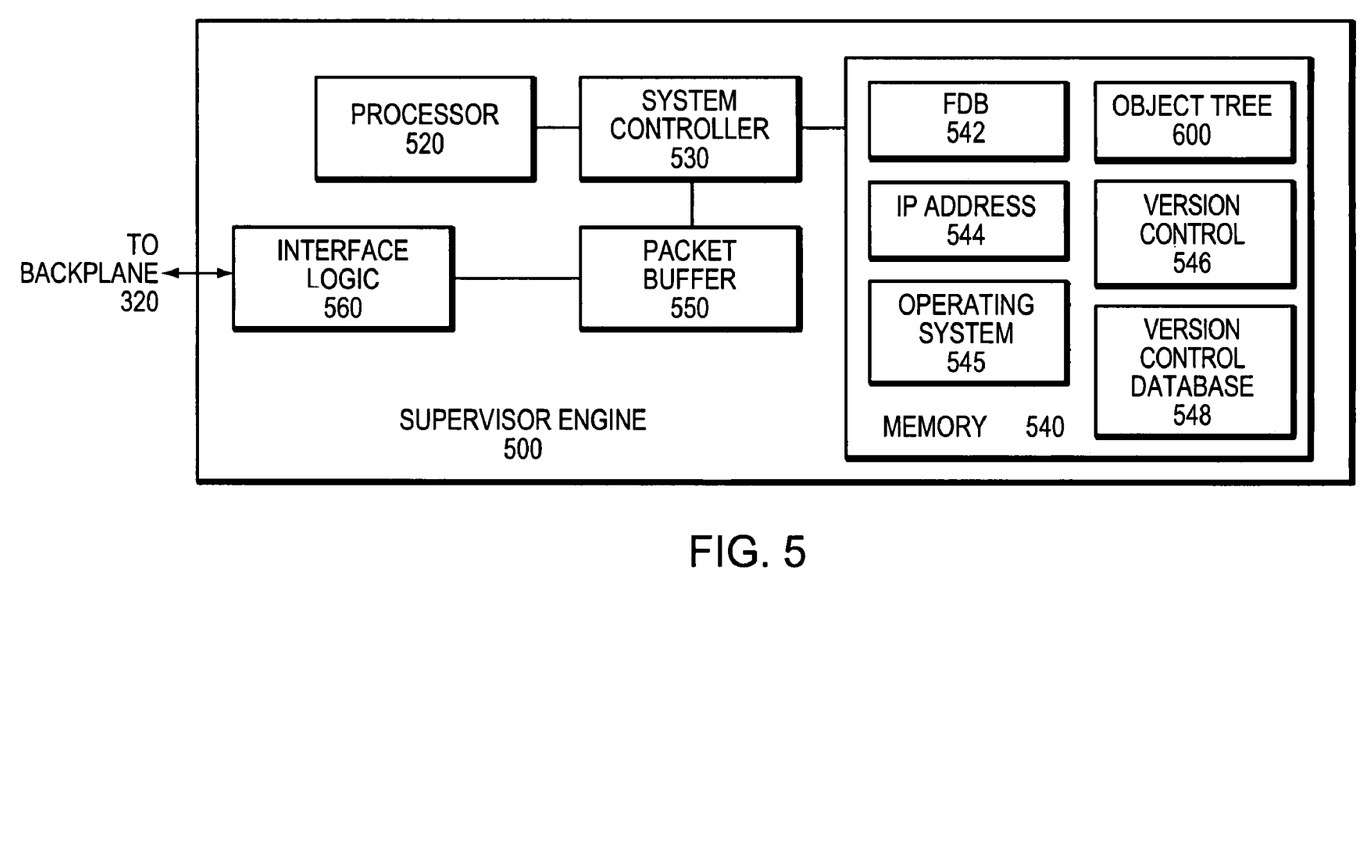
FIG. 5 is a high-level partial schematic block diagram of a supervisor engine that may be advantageously used with the present invention.

The supervisor engine 500 comprises logic that is configured to execute various protocols, such as OSPF, IS-IS and MPLS, and perform various functions, such as managing configurations associated with the intermediate node 300 in accordance with the inventive technique. FIG. 5 is a high-level partial schematic block diagram of a supervisor engine 500 that may be advantageously used with the present invention. Supervisor engine 500 comprises a processor 520, system controller 530, interface logic 560, packet buffer 550 and memory 540. Interface logic 560 is coupled to the backplane 320, and is configured to transfer e.g., data packets between the backplane 320 and the supervisor engine 500. Packet buffer 550 is a conventional packet memory containing RAM devices capable of storing packets transferred by the interface logic 560 and processed by the processor 520.

The memory 540 is a computer readable medium comprising random access memory (RAM) locations addressable by the system controller 530 for storing, inter alia, data structures and software programs related to the inventive technique. Illustratively, memory 540 comprises RAM devices, such as Dynamic Random Access Memory (DRAM) devices, configured to implement e.g., a 128 Megabyte (Mb) RAM. Memory 540 contains software and data structures used by processor 520 including a forwarding database (FDB) 542, an IP address 544, an operating system 545, an object tree 600, version control software 546 and a version control database 548. The FDB 542 contains information that the supervisor engine 500 uses to process data packets acquired by the supervisor engine 500 including making forwarding decisions for the packets. The IP address 544 illustratively contains an IP address that may be used to address packets destined for the supervisor engine 500.

Operating system 545 contains computer executable instructions configured to functionally organize the intermediate node 300 by, inter alia, providing operations in support of software processes executing on the supervisor engine 500. These processes may include software functions that implement various routing and switching protocols supported by the intermediate node 300, as well as functions that implement aspects of the inventive technique.

System controller 530 is coupled to the processor 520, memory 540 and packet is buffer 550 and comprises circuitry configured to enable processor 520 to access (e.g., read, write) memory locations contained in the memory 540 and packet buffer 550. Processor 520 is a conventional routing processor configured to execute instructions contained in memory 540 including instructions for managing configurations associated with intermediate node 300 in accordance with the inventive technique.

Operationally, data packets are acquired from the network 100 by the network interface 420 via ports 315 and transferred to the EARL 450 where the packets are processed. This processing may include using the LCFDB 452 to determine a destination for each packet, such as another card coupled to the backplane 320 or a port 315 on the line card 400. After the destination for a packet is determined, the EARL 450 directs the backplane interface 460 to transfer the packet to the destination via the backplane 320, if the destination is another card, or to the output queuing logic 440, if the destination is a port on the line card 400. Data packets destined for the supervisor engine 500 are acquired from the backplane 320 by the interface logic 560 and placed in a packet buffer 550 where they are held for further processing by the processor 520.

The present invention relates to a technique for defining and maintaining configurations for an intermediate node. According to the technique, objects are defined to represent entities contained in the intermediate node. Each object is associated with a state that may represent parameters associated with the entity represented by the object. Moreover, the inventive technique incorporates a version control system that, inter alia, maintains versions of state for each object as well as configurations defined for the intermediate node. A configuration may be defined for the intermediate node by associating a version of state for the objects with a label.

Memory 540 contains various data structures and software programs including an object tree data structure 600 and a version control system comprising version control software 546 and version control database 548. The version control software 546 comprises computer instructions that are executed by processor 520 and configured to maintain versions of e.g., states associated with objects defined for intermediate node 300. These versions of states are stored in a conventional database, such as version control database 548.

Figure 6:
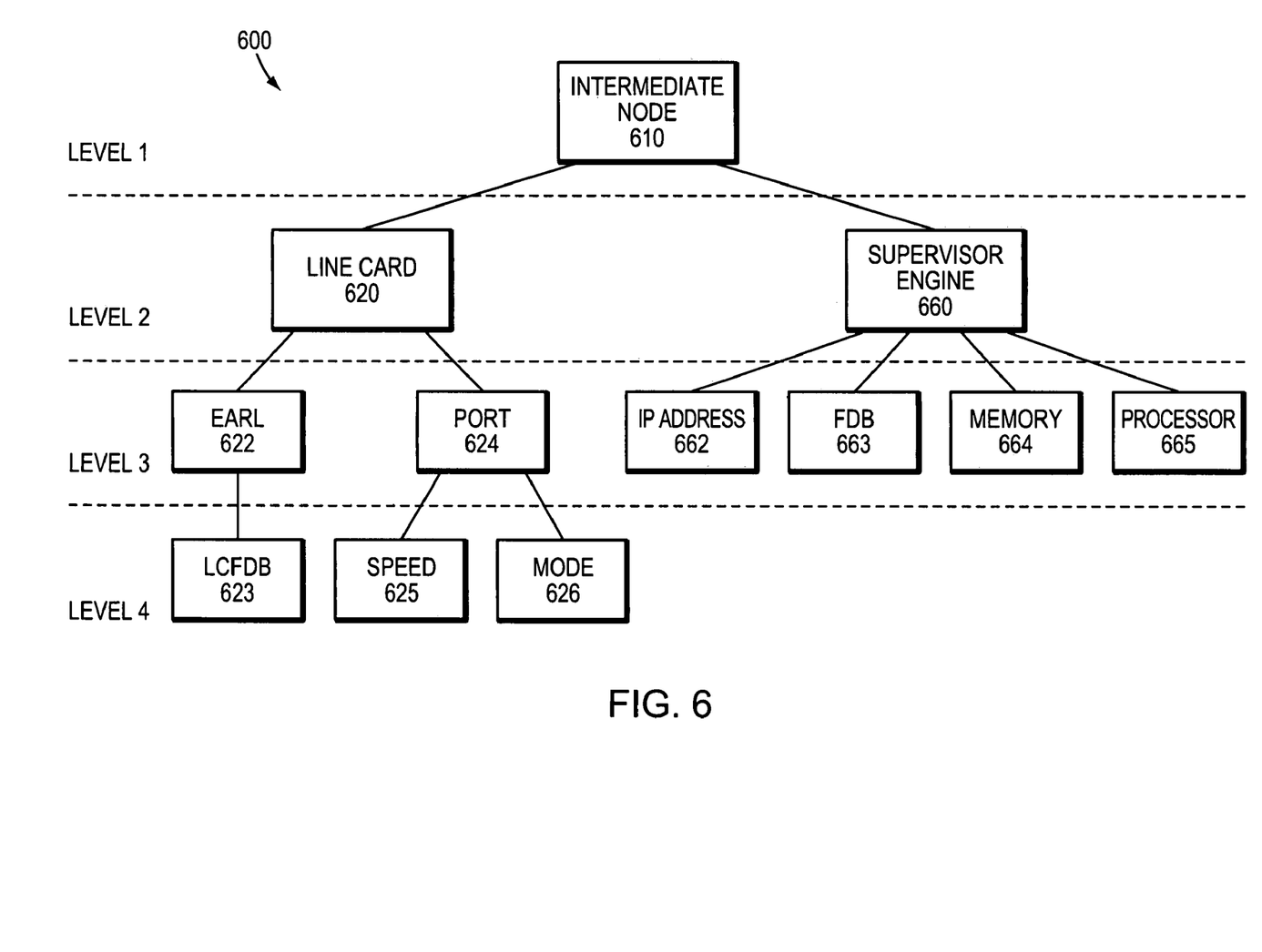
FIG. 6 illustrates a partial object hierarchy that may be advantageously used to represent entities contained in an intermediate node in accordance with the inventive technique.

Data structure 600 illustratively contains an object tree, which represents various objects defined for intermediate node 300. FIG. 6 is a diagram that illustrates an exemplary object tree contained in data structure 600 that may be used with the present invention. The objects are represented in a hierarchy starting with a "top level" (Level 1) intermediate node object 610. The hierarchy further contains a line card object 620 and a supervisor engine object 660 represented at the second level (Level 2) in the hierarchy. The line card object 620 contains an EARL object 622 and a port object 624 at a third level (Level 3) in the hierarchy. Further, the EARL object 622 contains an LCFDB object 623, while the port object 624 contains a speed object 625 and a mode object 626. Objects 623, 625 and 626 are represented at the "bottom level" (Level 4) in the hierarchy. Moreover, the supervisor engine object 660 contains an IP address object 662, a FDB object 663, a memory object 664 and a processor object 665 all of which are represented at the third level in the hierarchy. It should be noted that object tree 600 is provided for illustrative purposes only and that object trees containing many objects and far more complex hierarchies may take advantage of the inventive technique.

The objects contained in the tree represent various entities including e.g., the intermediate node 300 and entities contained in the intermediate node, such as line cards 400 and the supervisor engine 500. The intermediate node 300 is represented at the top level by the intermediate node object 610 and all other objects including the line card object 620 and supervisor engine object 660 that are subordinate to the intermediate node object 610. Likewise, a line card 400 is represented by the line card object 620 and those objects subordinate to the line card object 620 in the hierarchy including the EARL object 622, LCFDB object 623, port object 624, speed object 625 and mode object 626. The EARL object 622 represents the EARL 450 on the line card and the LCFDB object 623 to represents the LCFDB 452 contained within the EARL 450. The port object 624 represents a port 315 on the line card. Associated with the port object 624 are various objects that represent attributes associated with the represented port 315, including a speed object 625 representing a speed 422 associated with the port 315 and a mode object 626 representing a mode 424 associated with the port 315. The supervisor engine 500 is represented by the supervisor object 660 and objects subordinate to the supervisor object 660. These subordinate objects include an IP address object 662 which represents IP address 544, a FDB object 663 which represents forwarding database 542, a memory object 664 which represents memory 540 and a processor object 665 which represents processor 520.

In accordance with the inventive technique, versions of states associated with the objects defined for an intermediate node are maintained in a version control system. Version control systems and their implementations are well known in the art and thus will not be discussed in great detail here. A suitable version control system that may be used with the inventive technique is the IBM Rational ClearCase system available from IBM Corp., Armonk, N.Y. In addition, many commercially available database management systems may be used to implement a version control system suitable for use with the present invention.

Figure 7:
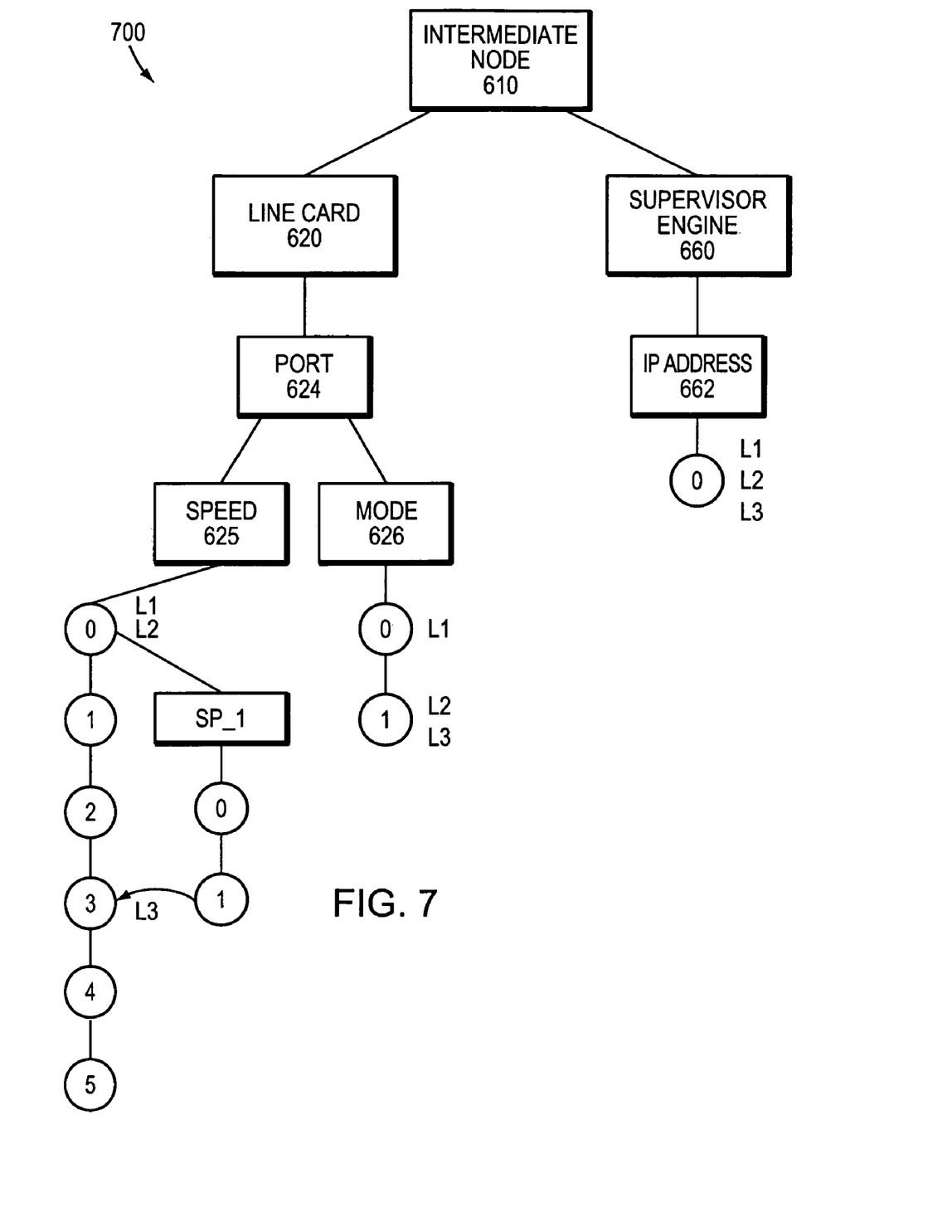
FIG. 7 is an exemplary version control tree that may be used with the present invention.

Illustratively, the version control software 546 maintains versions of an object's state in the version control database 548 as data records organized to form a version control tree containing a "mainline" and "branches." FIG. 7 is an exemplary block diagram of a version control tree 700 illustrating various versions for objects contained in object tree 600 that may be used with the present invention. Version control tree 700 contains "mainline" and "branches" for various objects contained in intermediate node 300. Note that, for illustrative purposes only, version control tree 700 shows mainlines and branches for the speed object 625, mode object 626 and the IP address object 662. It should be understood, however, that mainlines and branches may be maintained for other objects defined for the intermediate node 300.

The mainline and branches of an object comprise one or more versions wherein each version contains a state associated with the object. Further, each version is associated with a version number that uniquely identifies the version. Thus, for example, the speed object 625 contains six mainline versions numbered 0 through 5. A branch named "SP_1" stems from the mainline at version 0 and contains two versions 0 and 1. The mode object 626 contains two mainline versions numbered 0 and 1 and the IP address object 662 contains a single version, i.e., 0.

Branches that stem from the mainline are independent from the mainline in that the state of an object maintained at a branch is independent of the state of the object maintained at the mainline. Moreover, the state maintained at a branch may be "merged" with the mainline to incorporate changes made to the state at that branch. For example, version 1 of the branch named "SP_1" is merged with mainline version 3 of the speed object, as indicated by the arrow pointing from the branch's version 1 to the mainline's version 3. Thus, version 3 of the mainline incorporates changes made to the state at branch "SP_1."

For convenience, labels may be used to collectively associate versions of objects with a single "name." For example, version 0 of the speed 625, mode 626, and IP address 662 objects are collectively associated with a label named "L1." Likewise, version 0 of the speed object 625, version 1 of the mode object 626 and version 0 of the IP address object 662 are collectively associated with a label named "L2." One advantage associated with labels is that they may function as a name that may be used to identify configurations of the intermediate node 300. Thus, for example, the label "L2" may be used to identify a configuration for node 300 that comprises version 0 of the speed object's state, version 1 of the mode object's state and version 0 of the IP address object's state.

Illustratively, a new version for an object is generated in the version control tree when an object's state has changed and the changed state is saved e.g., in the version control database 548. The changed state of the object is saved in the new version. For example, assume version 0 of the mode object 626 contains a state indicating full-duplex mode. Further assume the object's state is changed to indicate half-duplex mode and the version control system is directed to save the changed object's state. The version control system generates a new version, i.e., version 1, in e.g., the version control database 548 and saves the changed state, i.e., half-duplex mode, in the new version.

In general, the inventive technique may be used to i) establish a first version of an intermediate node's configuration, ii) generate a second version of the intermediate node's configuration, apply the version to the intermediate node and iii) "roll back" to a previous version if an error is detected with the second version. The second version of the configuration may include changes to any number of entities contained in the intermediate node. Illustratively, the entities that are rolled back include only those entities that changed between the first version and the second version of the configuration.

Figure 8:
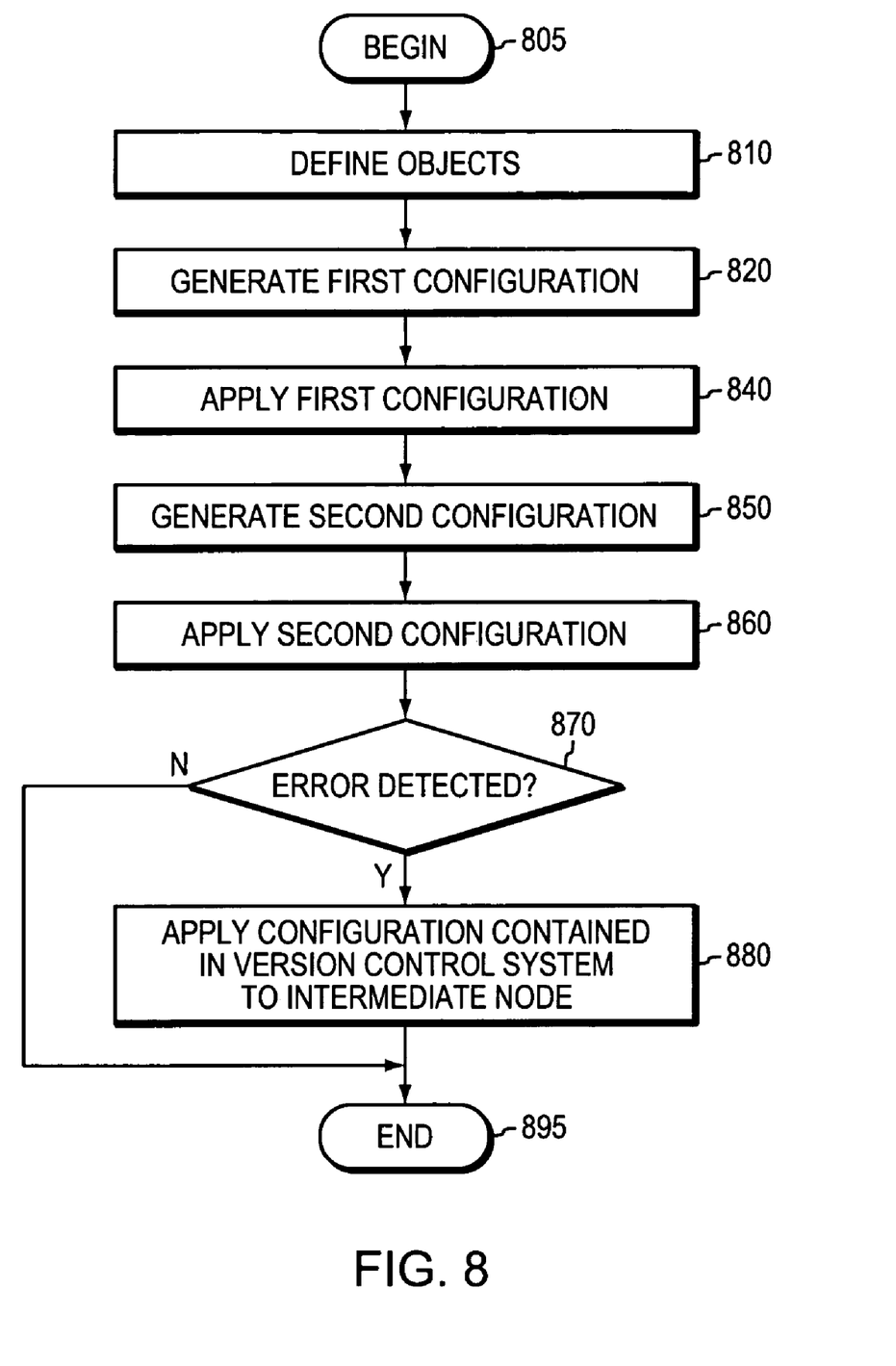
FIG. 8 is a high-level flow diagram of a sequence of steps that may be used to implement the present invention.

FIG. 8 is a high-level flow diagram of a sequence of steps that may be used to i) apply a first configuration to an intermediate node, ii) apply a second configuration to the intermediate node and iii) if an error occurs with the second configuration, roll back to a prior configuration. The sequence begins at Step 805 and proceeds to Step 810 where objects that represent entities contained in the intermediate node 300 are defined and maintained in object tree 600. Illustratively, the objects are defined using the NMS 244 contained in management system 200. Alternatively, the objects may be defined using, e.g., a command-line interpreter (CLI) that interfaces with intermediate node 300 and enables a user to manually define the objects. Further, the objects may be defined using, e.g., software that identifies various entities contained in the intermediate node 300 and defines objects to represent those entities.

At Step 820, a first configuration of the intermediate node is established by i) establishing states for objects defined for the intermediate node, ii) generating new versions in, e.g., the version control database 548 to hold the established states, iii) saving the states in the new versions and iii) labeling the new versions, as described above, with a label that is used to identify the first configuration. It should be noted that a configuration of an intermediate node 300 may include the states of all or some of the objects defined for the intermediate node 300. At Step 840, the configuration is applied to the intermediate node by i) acquiring the states of objects associated with the configuration from, e.g., the version control database 548 and ii) configuring the entities in the intermediate node represented by the objects in accordance with the acquired states.

For example, assume a first configuration, named "L1," contains a speed object 625, a mode object 626, and an IP address object 662 and the states established for the objects are 10 Megabits-per-second (Mbps), full-duplex and 129.1.0.1, respectively. Assume the new version generated for each object is version 0 for that object. The state of the object is saved in the generated version. The version for each object is then labeled "L1." The first configuration is applied to an intermediate node 300 by acquiring the state associated with label L1 (i.e., version 0 of each object) and configuring the entities represented in accordance with the acquired state. Thus, the speed 422, mode 424 and IP address 544 entities contained in the intermediate node are set to 10 Mbps, full-duplex and 129.1.0.1, respectively.

At Step 850, a second configuration is generated illustratively by i) changing the states of one or more objects defined for the intermediate node 300, ii) generate new versions in, e.g., the version control database 548 to hold the changed states, iii) saving the changed states in the new versions and iv) labeling the new versions with a label that is used to identify the second configuration, as described above. For example, assume a user changes the mode object 626 from full-duplex to half-duplex and directs the version control system to save the change and generate a new configuration named "L2" containing the speed object 625, mode object 626 and IP address object 662. The version control system i) generates a new version for the mode object (i.e., version 1) in, e.g., the version control database 548, ii) saves the changed state of the mode object 626 in the new version and labels version 0 of the speed object 625, version 1 of the mode object 626 and version 0 of the IP address object 662 as "L2."

Note that, illustratively the second configuration is saved in an "incremental" fashion in that only the states of the changed objects are saved in the database 548. Thus, in the example above, only the state of the mode object 626 is saved. In addition, illustratively "undo" state, that enables changes made to entities in accordance with the new state to be "undone," may be generated and saved in the version control database 548. The undo state may comprise, e.g., instructions configured to direct the intermediate node 300 to configure the one or more entities in the intermediate node 300 in accordance with a version of state saved in the version control system, such as the version of state associated with the first configuration or the version of state associated with a default configuration. In addition, the undo state may comprise, e.g., instructions that configure the intermediate node 300 in accordance with a particular configuration saved in the version control system.

At Step 860, the second configuration is applied to the intermediate node. Illustratively, the configuration is applied in an incremental manner such that only entities whose object state has changed from the prior configuration are configured in accordance with the state associated with the second configuration. Thus, in the example above, since the prior configuration is the first configuration and only the state of the mode object 626 changed from the first configuration to the second configuration, only the mode entity 424 is configured in accordance with the state associated with the second version (i.e., the state labeled L2). The other entities are not configured, as their object states had not changed from the first configuration.

At Step 870, a check is performed to determine if an error condition is detected with the second configuration. For example, if the mode entity 424 does not support a half-duplex mode, attempting to set the entity 424 to half-duplex may generate an error condition. If an error condition is not detected, the sequence proceeds to Step 895 where the sequence ends.

Otherwise, the sequence proceeds to Step 880 where illustratively a configuration contained in the version control system is applied to the intermediate node. The configuration applied may be the configuration applied to the intermediate node immediately prior to the second configuration, which in this case is the first configuration. Further, illustratively, the configuration is applied in an incremental manner using the undo information saved for the state that changed between the configuration being applied and the second configuration. Alternatively, the configuration may be applied incrementally by comparing the current configuration of the intermediate node with the configuration to be applied to determine differences in the configuration of the entities between the two to configurations and changing only those entities that are different. The sequence ends at Step 895.

Figure 9:
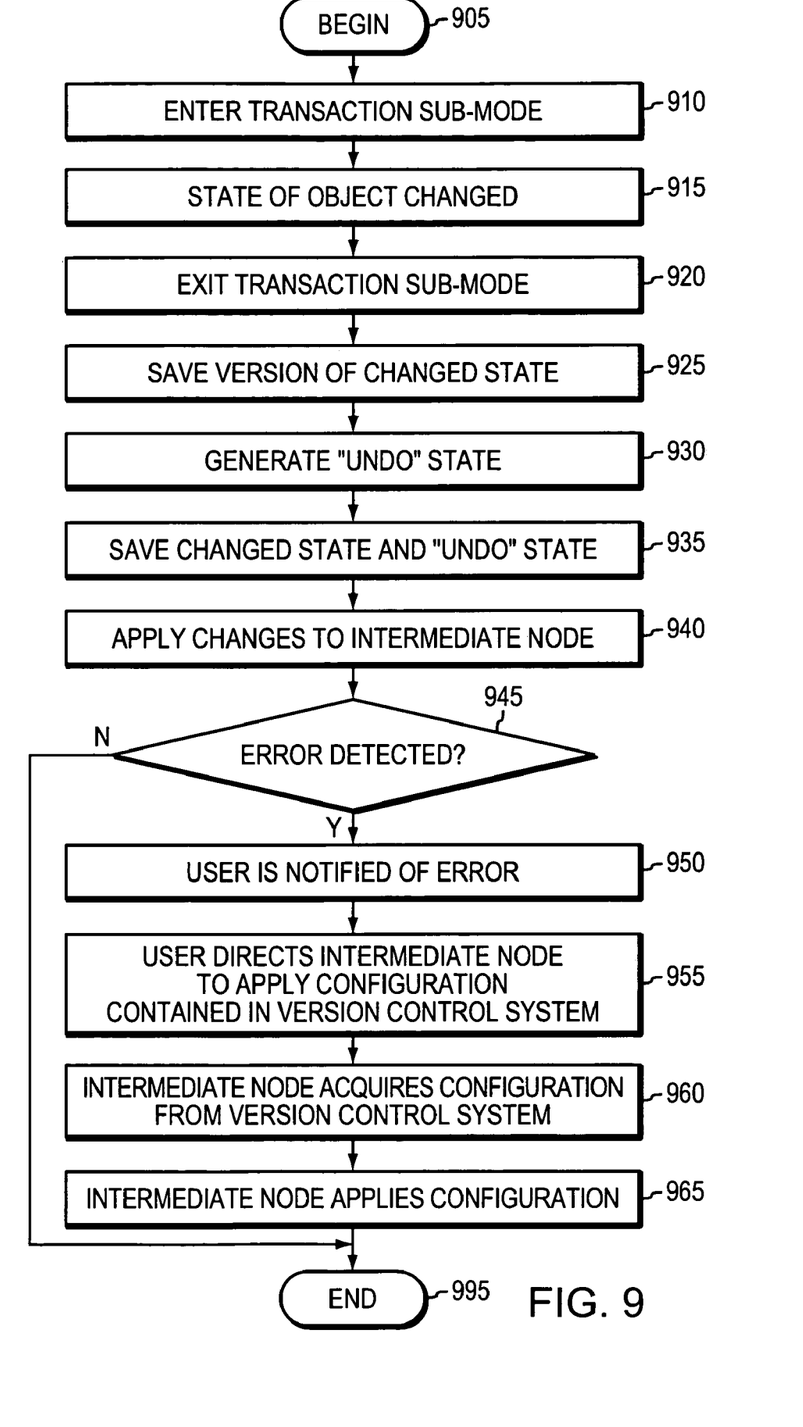
FIG. 9 is a flow diagram of a sequence of steps that may be used by a user to apply changes to an intermediate node's configuration and roll back the changes in accordance with the inventive technique.

As noted above, the inventive technique may be used to manually manage configurations for an intermediate node. FIG. 9 is a flow diagram of a sequence of steps that may be used to manually manage configurations for an intermediate node in accordance with the inventive technique. The sequence begins at Step 905 and proceeds to Step 910 where a user manually enters a transaction by entering (e.g., via the CLI or NMS 244) a transaction sub-mode. In this context, a transaction involves changing one or more object states that make up a configuration and applying the changes to the intermediate node, as described above. Further, the transaction may involve saving the changes to the configuration in, e.g., the version control database 548. A transaction sub-mode is a mode within a transaction that includes all or a portion of the operations performed within a transaction. For example, a sub-mode may comprise making changes to an object's state without applying the changes to entities in the intermediate node 300 and/or saving the changes in the version control system.

At Step 915, the user makes changes to the states of one or more objects defined for the intermediate node 300. As noted above, the changes may be illustratively made via the CLI and/or the NMS 244. Next, at Step 920, the user exits the transaction submode.

At Step 925, the user directs the intermediate node 300 to save a version of the changed configuration. Illustratively, the intermediate node 300 responds by i) generating "undo state" and ii) directing the version control system to save the changed states and undo state as new object versions in the version control database 548 (Steps 930-935), as described above.

At Step 940, the user applies the changes to the intermediate node 300. Illustratively, the user directs the NMS 244 to apply the changes which, in turn, notifies the intermediate node 300 that the changes are to be applied. The intermediate node 300 acquires the changed states from, e.g., the version control system and changes entities in the intermediate node 300 in accordance with the changed states, as described above.

It should be noted that all or some of the operations performed in Steps 930-940 may be performed automatically (i.e., without user intervention) when a user exits a transaction sub-mode. For example, on exiting a transaction sub-mode, the intermediate node 300 may generate the undo state, save the changed and undo state and apply the changes automatically.

At Step 945, a check is performed to determine if an error occurred as a result of applying the changes. If not, the sequence proceeds to Step 995 where the sequence ends. Otherwise, the sequence proceeds to Step 950 where the user is notified of the error via, e.g., the NMS 244. In response, the user, via the NMS 244, directs the intermediate node 300 to configure the entities in the intermediate node 300 in accordance with a configuration contained in the version control system (Step 955). Illustratively, this configuration is the configuration used to configure the intermediate node 300 prior to the changes. The intermediate node 300, in turn, acquires the configuration and applies it, as described above (Steps 960-965). The sequence ends at Step 995.

As noted above, the inventive technique may be used with systems that configure an intermediate node automatically (i.e., without user intervention). For example, in an automated system, an intermediate node may be configured automatically on a daily basis using a first configuration during a particular time of day and a second configuration at another time of the day.

Figure 10:
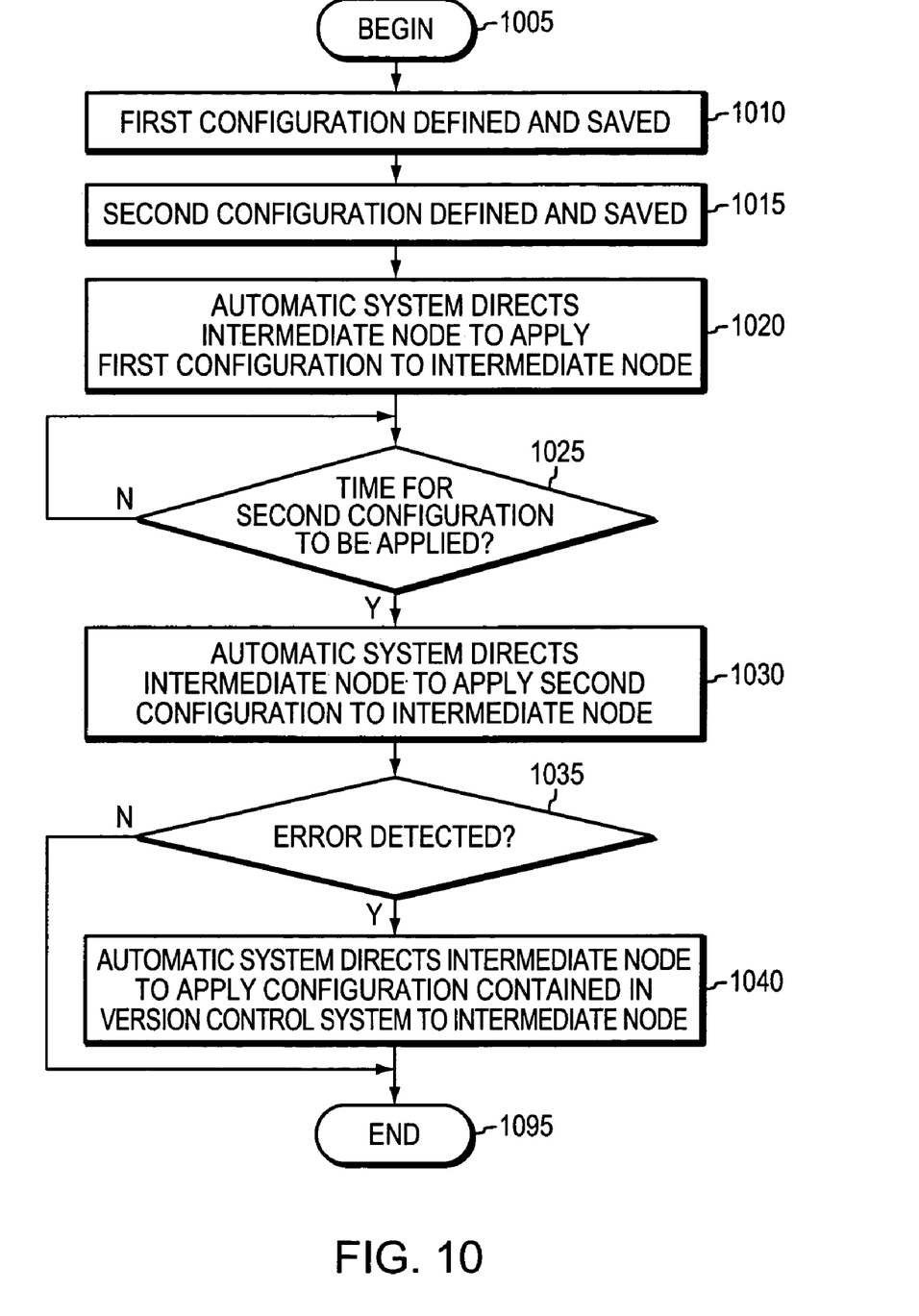
FIG. 10 is a flow diagram of a sequence of steps that may be used by an automated system to apply changes to an intermediate node's configuration and rollback the changes in accordance with the inventive technique.

FIG. 10 is a flow diagram of a sequence of steps that may be used to configure an intermediate node in accordance with the inventive technique using an automated system. Assume, for illustrative purposes, that the automated system applies a first configuration labeled "L1" (FIG. 7) to an intermediate node 300 at one time of the day and applies a second configuration labeled "L2" to the intermediate node 300 at another time of the day. The sequence begins at Step 1005 and proceeds to Step 1010 where the first configuration is defined, labeled and saved in the version control system, as defined above. Next at Step 1015, the second configuration is defined, labeled and saved in the version control system, as defined above.

At Step 1020, the automatic system directs the intermediate node to apply the first configuration. In response, the intermediate node 300 acquires the object state associated with the first configuration from the version control system and configures entities in the intermediate node 300 in accordance with the object state, as described above. A check is then performed, at Step 1025, to determine if it is time to apply the second configuration to the intermediate node 300. If not, the sequence returns to Step 1025. Otherwise, the sequence proceeds to Step 1030 where the object state associated with the second configuration is acquired and applied to the intermediate node 300, as described above.

At Step 1035, a check is performed to determine if an error has been detected as a consequence of applying the second configuration. If not, the sequence proceeds to Step 1095 where the sequence ends. Otherwise, the sequence proceeds to Step 1040 where the automatic system directs the intermediate node 300 to apply a configuration contained in the version control system, as described above. Illustratively, the configuration applied is the first configuration. The sequence then ends at Step 1095.

It should be noted that in the above-illustrated embodiment of the invention, information associated with configuring entities in an intermediate node 300 is maintained by the intermediate node 300. This is not intended to be a limitation of the present invention. In other embodiments of the invention, the version control system resides within a system capable of communicating with the intermediate nodes 300, such as management system 200.

In other embodiments of the invention, the functions performed by the version control system are dispersed between the intermediate node 300 and another node capable of communicating with the intermediate node 300, such as management system 200. For example, in one embodiment, functions performed by the version control software 546 are performed on the intermediate node 300 and functions performed by the version control database 548 (e.g., storing and retrieving version tree information) are performed on the node in a communication relationship with the intermediate node 300.

It should also be noted that the automated system described above may be a software process contained in, e.g., the management system 200. Alternatively, all or part of the automatic system may be a software process contained within the intermediate node 300 that communicates with a version control system contained on, e.g., another node, such as the management system 200.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for configuring an intermediate node contained in a data network, the method comprising the steps of:
    defining a plurality of objects representing entities within the intermediate node;
    arranging, by a processor, the objects in a multi-level hierarchical object tree;
    saving a plurality of versions of state of at least some of the objects in a memory, the versions of state for each of these objects organized into a respective multi-level hierarchical version control tree, each multi-level hierarchical version control tree associated with a respective one of the objects in the multi-level hierarchical object tree;
    associating selected ones of the plurality of versions of state, that are each located in different multi-level hierarchical version control trees associated with different objects in the multi-level hierarchical object tree, with a first label to establish a first configuration of the intermediate node, the first label indicating a name of the first configuration; and
    configuring entities within the intermediate node according to the first configuration by accessing the selected ones of the plurality of versions of state of different objects, in the different multi-level hierarchical version control trees associated with the different objects, that are each associated with the first label.

2. The method as defined in claim 1 comprising the step of:
    defining the objects that represent the entities within the intermediate node to include an object that represents the intermediate node as a top level object.

3. The method as defined in claim 1 wherein the objects are defined using a network management system.

4. The method as defined in claim 1 wherein the version control trees are contained in the intermediate node.

5. The method as defined in claim 1 wherein the version control trees are contained in a management system.

6. The method as defined in claim 1 wherein the version control trees are contained in a version control database.

7. The method as defined in claim 6 wherein the version control database is maintained on a remote system capable of communicating with the intermediate node.

8. The method as defined in claim 1 comprising the steps of:
defining a second configuration of the intermediate node by generating a new plurality of versions of state for the objects;
saving the new plurality of versions of state in version control trees; and
associating the new plurality of versions of state with a second label, the second label indicating a name of the second configuration.

9. The method as defined in claim 8 comprising the step of:
configuring the entities in accordance with the second configuration.

10. The method as defined in claim 8 comprising the steps of:
generating undo state that enables the changes made in the second configuration to be undone; and
saving the undo state.

11. The method as defined in claim 10 wherein the undo state comprises instructions configured to direct the intermediate node to configure the entities in accordance with the first configuration.

12. The method as defined in claim 8 comprising the steps of:
configuring one or more entities contained in the intermediate node in accordance with the second configuration;
determining if an error has occurred; and
if so, configuring the entities in accordance with another configuration.

13. An apparatus comprising:
one or more entities of an intermediate node; and
a processor configured to:
a) define objects to represent the entities within the intermediate node and arranging the objects in a multi-level hierarchical object tree,
b) save a plurality of versions of state of at least some of the objects, the versions of state for each of these objects organized into a respective multi-level hierarchical version control tree, each multi-level hierarchical version control tree associated with a respective one of the objects in the multi-level hierarchical object tree,
c) associate selected ones of the plurality of versions of state, in different multi-level hierarchical version control trees associated with different objects in the multi-level hierarchical object tree, with a first label to establish a first configuration of the intermediate node, the first label indicating a name of the first configuration; and
d) configure entities within the intermediate node according to the first configuration by accessing the selected ones of the plurality of versions of state of different objects, in the different multi-level hierarchical version control trees associated with the different objects, that are each associated with the first label.

14. The apparatus as defined in claim 13 wherein the version control trees are contained in a version control database.

15. The apparatus as defined in claim 14 wherein the processor is configured to:
a) generate a new configuration of the intermediate node by saving a new plurality of versions of state in version control trees of the version control database; and b) associate the new plurality of versions of state with a second label, the second label indicating a name of the second configuration.

16. The apparatus as defined in claim 13 wherein the processor is further configured to:
a) generate undo state that configures the entities in accordance with a prior saved configuration; and
b) save the undo state.

17. An intermediate node comprising:
one or more entities;
means for defining a plurality of objects representing the entities within the intermediate node and arranging the objects in a multi-level hierarchical object tree;
means for saving a plurality of versions of state of at least some of the objects, the versions of state for each of these objects organized into a respective multi-level hierarchical version control tree, each multi-level hierarchical version control tree associated with a respective one of the objects in the multi-level hierarchical object tree;
means for associating selected ones of the plurality of versions of state, that are each located in different multi-level hierarchical version control trees associated with different objects in the multi-level hierarchical object tree, with a first label to establish a first configuration of the intermediate node, the first label indicating a name of the first configuration; and
means for configuring entities within the intermediate node according to the first configuration by accessing the selected ones of the plurality of versions of state of different objects, in the different multi-level hierarchical version control trees associated with the different objects, that are associated with the first label.

18. A non-transitory computer readable medium comprising computer executable instructions for:
defining a plurality of objects to represent entities contained in an intermediate node and arranging the objects in a multi-level hierarchical object tree;
saving a plurality of versions of state of at least some of the objects, the versions of state for each of these objects organized into a respective multi-level hierarchical version control tree, each multi-level hierarchical version control tree associated with a respective one of the objects in the multi-level hierarchical object tree;
associating selected ones of the plurality of versions of state, that are each located in different multi-level hierarchical version control trees associated with different objects in the multi-level hierarchical object tree, with a first label to establish a first configuration of the intermediate node, the first label indicating a name of the first configuration; and
configuring entities within the intermediate node according to the first configuration by accessing the selected ones of the plurality of versions of state of different objects, in the different multi-level hierarchical version control trees associated with the different objects, that are each associated with the first label.

19. The method as defined in claim 1 comprising the step of:
configuring at least some of the version control trees to have a mainline and one or more branches, where state of an object maintained in versions of state on a branch is independent of state of the object maintained in versions of state on the mainline.

20. The method as defined in claim 19 comprising the step of:
  merging a version of state of an object on a branch with a version of state of the object on the mainline to incorporate changes made to state by the branch.

21. The apparatus as defined in claim 13 wherein the processor is further configured to:
  configure at least some of the version control trees to have a mainline and one or more branches, where state of an object maintained in versions of state on a branch is independent of state of the object maintained in versions of state on the mainline.

22. The apparatus as defined in claim 21 wherein the processor is further configured to:
  merge a version of state of an object on a branch with a version of state of the object on the mainline to incorporate changes made to state by the branch.

23. The method as defined in claim 1 wherein the step of configuring is performed, automatically, without user intervention, in response to reaching a first time.

24. A method comprising:
  defining, by a processor, a plurality of objects representing entities of an intermediate node;
  saving a plurality of versions of state of at least some of the objects in a memory, the versions for each of these objects organized into a respective multi-level hierarchical version control tree, each multi-level hierarchical version control tree associated with a respective one of the objects;
  associating first selected ones of the plurality of versions of state, that are each located in different multi-level hierarchical version control trees associated with different objects, with a first label to establish a first configuration of the intermediate node, the first label indicating a name of the first configuration;
  associating second selected ones of the plurality of versions of state, that are each located in different multi-level hierarchical version control trees associated with different objects, with a second label to establish a second configuration of the intermediate node, the second label indicating a name of the second configuration;
  in response to reaching a first time, automatically, without user intervention, configuring entities of the intermediate node according to the first configuration by accessing the first selected ones of the plurality of versions of state in the different multi-level hierarchical version control trees that are associated with the first label; and
  in response to reaching a second time, automatically, without user intervention, configuring entities of the intermediate node according to the second configuration by accessing the second selected ones of the plurality of versions of state in the different multilevel hierarchical version control trees that are associated with the second label.

25. The method as defined in claim 24 wherein the first time is a first time of day and the second time is a second time of day.

26. An apparatus comprising:
  one or more entities of an intermediate node;
  a memory; and
  a processor configured to
    define a plurality of objects representing the entities of the intermediate node,
    save a plurality of versions of state of at least some of the objects in the memory, the versions of objects organized into respective multi-level hierarchical version control trees, each multi-level hierarchical version control tree associated with a respective one of the objects,
    associate first selected ones of the plurality of versions of state, that are each located in different multi-level hierarchical version control trees associated with different objects, with a first label to establish a first configuration of the intermediate node, the first label indicating a name of the first configuration,
    associate second selected ones of the plurality of versions of state, that are each located in different multi-level hierarchical version control trees associated with different objects, with a second label to establish a second configuration of the intermediate node, the second label indicating a name of the second configuration,
    automatically configure entities of the intermediate node according to the first configuration using the first selected ones of the plurality of versions of state in the different multi-level hierarchical version control trees that are associated with the first label, in response to reaching a first time, and
    automatically configure entities of the intermediate node according to the second configuration by accessing the second selected ones of the plurality of versions of state in the different multi-level hierarchical version control trees that are associated with the second label, in response to reaching a second time.

27. The apparatus as defined in claim 26 wherein the first time is a first time of day and the second time is a second time of day.

* * * * *

UNITED STATES PATENT AND TRADEMARK OFFICE
CERTIFICATE OF CORRECTION

| | |
|---|---|
| PATENT NO. | : 7,860,959 B1 |
| APPLICATION NO. | : 10/793195 |
| DATED | : December 28, 2010 |
| INVENTOR(S) | : Danny Karpati et al. |

It is certified that error appears in the above-identified patent and that said Letters Patent is hereby corrected as shown below:

Col. 2, Line 19, please replace "would to have" with --would have--

Col. 4, Line 19, please replace "user is logged" with --user logged--

Col. 5, Line 29, please delete "form"

Col. 5, Line 30, please replace "warding" with --forwarding--

Col. 6, Line 10, please replace "packet is buffer" with --packet buffer--

Col. 7, Line 20, please delete "to"

Col. 10, Line 26, please delete "to"

Signed and Sealed this
Seventeenth Day of May, 2011

David J. Kappos
*Director of the United States Patent and Trademark Office*